Feb. 4, 1958 W. H. ZEILER 2,821,781
TUBING CUTTER
Filed Nov. 23, 1956
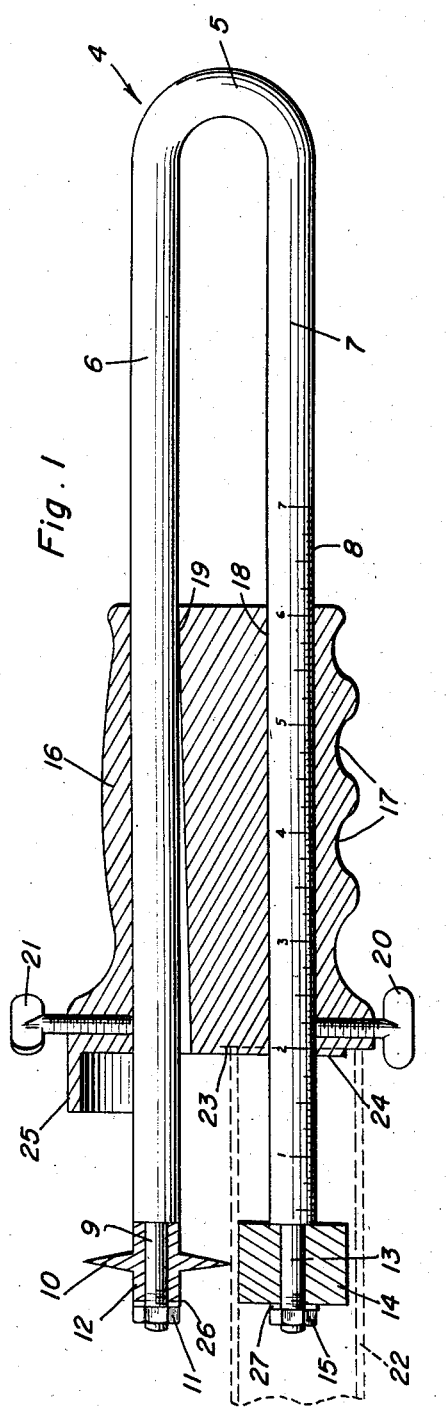
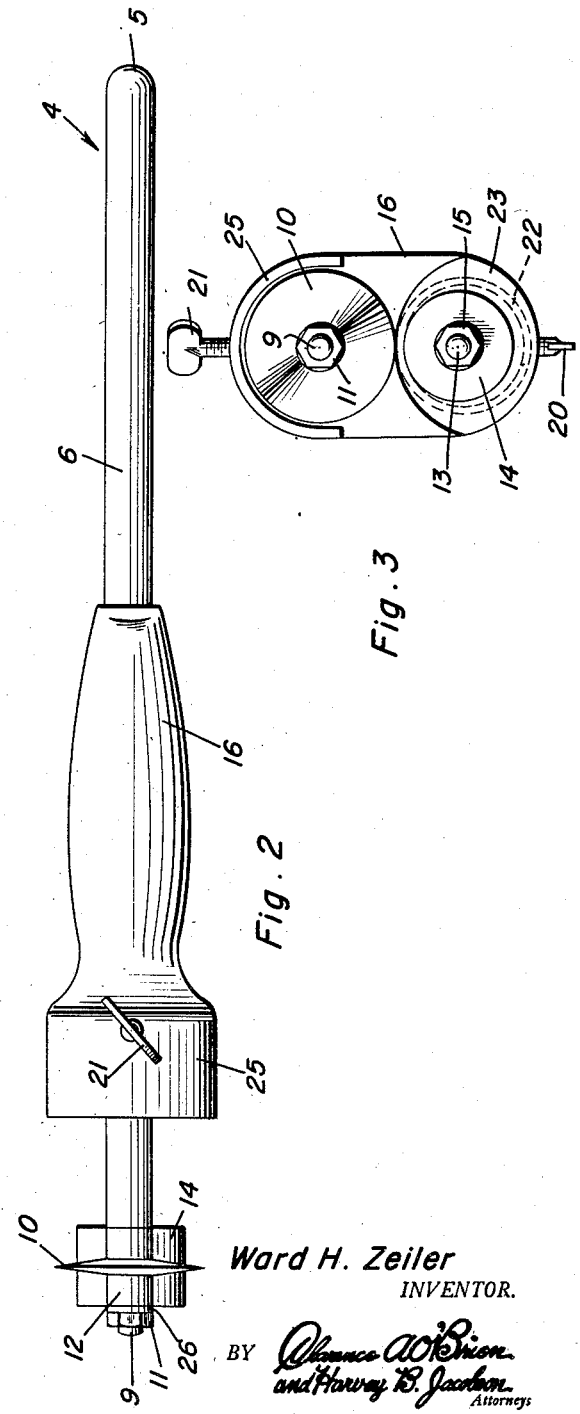
Ward H. Zeiler
INVENTOR.

2,821,781

TUBING CUTTER

Ward H. Zeiler, Holyoke, Colo.

Application November 23, 1956, Serial No. 624,115

3 Claims. (Cl. 30—102)

The present invention relates to new and useful improvements in tubing cutters particularly for plumbers and has for its primary object to provide, in a manner as hereinafter set forth, novel means whereby tubes of various sizes and especially relatively large, brass tubes, may be expeditiously and with a minimum of effort, cut off without bending and in a manner to leave a clean, square-cut burrless end.

Another very important object of the invention is to provide a plumber's tool of the aforementioned character which may be readily adjusted to accurately cut the tube in any desired length.

Other objects of the invention are to provide an adjustable tubing cutter of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in vertical longitudinal section through a tubing cutter constructed in accordance with the present invention;

Figure 2 is a top plan view of the tool; and

Figure 3 is a view in front elevation of the device.

Referring now to the drawing in detail, it will be seen that the embodiment of the invention which has been illustrated comprises an elongated, substantially U-shaped frame which is designated generally by reference character 4. The frame 4 is formed from a single length of suitable resilient metal in the form of a shaft or rod of circular cross-section which is bent upon itself at an intermediate point in a manner to provide a bight portion 5 and upper and lower or outer and inner legs 6 and 7, respectively. The leg 7 is provided with a scale 8.

The leg 6 terminates in a reduced forward or free end portion 9 having journaled thereon a tapered circular cutting knife or disk 10 comprising an integral hub 12. A retaining nut 11 is threaded on the end portion of the leg 6 for the cutting knife or disk 10. A friction washer 26 is provided between the nut 11 and the knife hub 12.

The leg 7 terminates in a reduced forward or free end portion 13 having journaled thereon a somewhat elongated roller 14 providing a dolly which is opposed to and cooperable with the knife or disk 10. A retaining nut 15 is provided for the roller 14. A friction washer 27 is mounted between the nut 15 and the roller 14.

Mounted for longitudinal sliding adjustment on the legs 6 and 7 of the frame 4 is a metallic sleeve 16. The sleeve 16 is formed to provide a grip type handle, said sleeve having finger receiving notches or recesses 17 in its lower portion. The lower portion of the sleeve 16 has formed therein a longitudinal bore 18 of uniform diameter which slidably accommodates the leg 7. Extending through the upper portion of the sleeve 16 is a bore 19 for the leg 6. The bore 19 tapers to a substantially oval or vertically elongated forward end which permits bending or flexing of the leg 6 therein.

A setscrew 20 is threadedly mounted in the lower, forward end portion of the sleeve 16 and engageable with the leg 7 for securing said sleeve in adjusted position on the frame 4. A feed screw 21 is threadedly mounted in the upper, forward end portion of the sleeve 16 for bending the leg 6 therein thereby engaging the knife 10 with the work, as indicated at 22.

The foregoing end of the sleeve 16 is provided, in its lower portion, with a groove or recess 23 formed to provide a substantially circular projection 24 which encircles the leg 7. The upper portion of the projection 24 is aligned with the corresponding portion of the roller 14 for engagement in the upper portion of the tube 22 for supporting same in an obvious manner. Projecting forwardly from the upper portion of the sleeve 16 is an arcuate guard 25 for shielding the knife 10 when the tool is not in use.

It is thought that the use of the device will be readily apparent from a consideration of the foregoing. Briefly, with the screw 21 in retracted position, the sleeve 16 is adjusted as desired on the frame 4 and secured by the setscrew 20. The leg 7 is then inserted in the tube 22 and the roller 14 and the projection 24 are engaged in the upper portion of said tube. The screw 21 is then tightened for bending the leg 6 of the frame 4, thus engaging the knife 10 with the periphery of the tube 22. With the roller 14 supporting the tube against bending, the tool is then turned in an obvious manner for causing the knife 10 to travel around and cut said tube off. Of course, during the cutting operation the screw 21 is adjusted from time to time as may be necessary to feed the knife 10 to the work.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tubing cutter comprising: an elongated handle having longitudinal bores therethrough, one of said bores being tapered, a substantially U-shaped resilient frame including legs extending slidably through the bores, a cutting disk on the free end portion of one of the legs operable about the tube to be cut, a roller journaled on the free end portion of the other leg engageable in the tube and cooperable with the cutting disk, one end of the handle being engageable with the tube to provide a stop therefor and having therein a recess defining a projection engageable in the tube for supporting same in conjunction with the roller, and a feed screw threadedly mounted in one end portion of the handle and engaged with said one leg in the large end portion of the tapered bore for bending said one leg within the confines of the handle for engaging the cutting disk with the tube.

2. A tubing cutter comprising: a substantially U-shaped resilient frame comprising a pair of legs, one of said legs being graduated, a cutting disk journaled on the free end portion of the other leg and operable circumferentially around a tube to be cut, a roller journaled on the free end portion of the graduated leg for engagement in the tube and cooperable with the cutting disk, an elongated handle substantially oval in cross-section mounted for longitudinal sliding adjustment on the frame and having bores extending longitudinally therethrough slidably accommodating the legs, said handle further having finger recesses in its lower portion, said handle being engageable at its forward end with the tube and having a recess therein for the reception of said tube, said recess defining a projection on the forward end of the handle engageable in the tube for supporting the same in conjunction with the roller, said handle still further including an arcuate guard on its forward end for shielding the cutting disk when said handle is in its forwardmost position on the frame, a setscrew threadedly mounted in the handle and engaged with the graduated leg for securing said handle in adjusted position on the frame, and means on the handle for engaging the cutting disk with the tube.

3. A tubing cutter comprising: a substantially U-shaped resilient frame comprising a pair of legs, one of said legs being graduated, a cutting disk journaled on the free end portion of the other leg and operable circumferentially around a tube to be cut, a roller journaled on the free end portion of the graduated leg for engagement in the tube and cooperable wtih the cutting disk, and elongated handle substantially oval in cross-section mounted for longitudinal sliding adjustment on the frame and having bores extending longitudinally therethrough slidably accommodating the legs, said handle further having finger recesses in its lower portion, said handle being engageable at its forward end with the tube and having a recess therein for the reception of said tube, said recess defining a projection on the forward end of the handle engageable in the tube for supporting the same in conjunction with the roller, said handle still further including an arcuate guard on its forward end for shielding the cutting disk when said handle is in its forwardmost position on the frame, a setscrew threadedly mounted in the handle and engaged with the graduated leg for securing said handle in adjusted position on the frame, and means on the handle for engaging the cutting disk with the tube, one of the bores being longitudinally tapered, said means including a thumb screw threadedly mounted in one end portion of the handle and engaged with said other leg in the large end portion of the tapered bore for bending said other leg within the confines of the handle.

References Cited in the file of this patent

UNITED STATES PATENTS

| | | |
|---|---|---|
| 909,182 | Hart | Jan. 12, 1909 |
| 1,028,870 | Fletcher | June 11, 1912 |
| 1,634,323 | Fletcher | July 5, 1927 |
| 1,691,530 | Slayton | Nov. 13, 1928 |